Dec. 22, 1931.          B. D. McINTYRE          1,837,914
PISTON CONSTRUCTION
Filed July 29, 1929
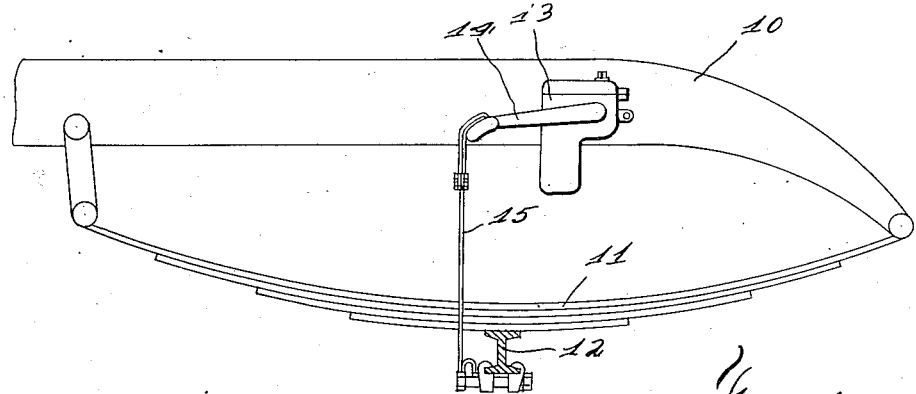
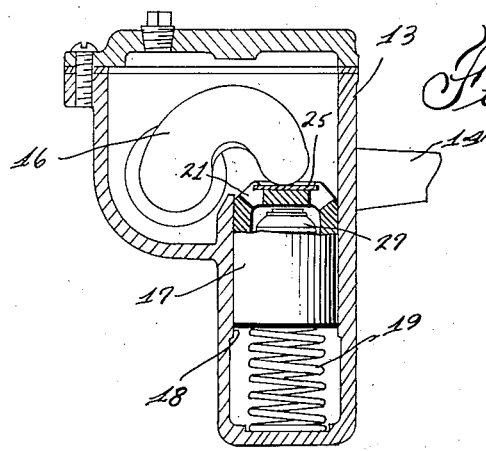
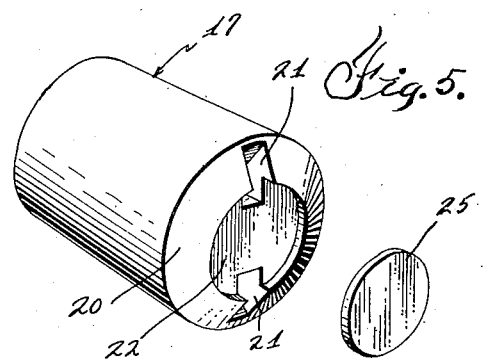
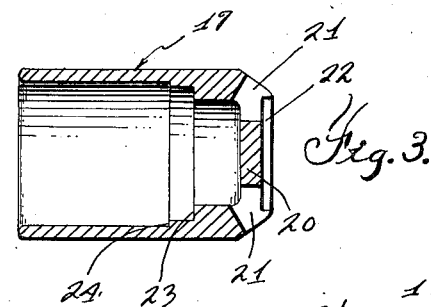
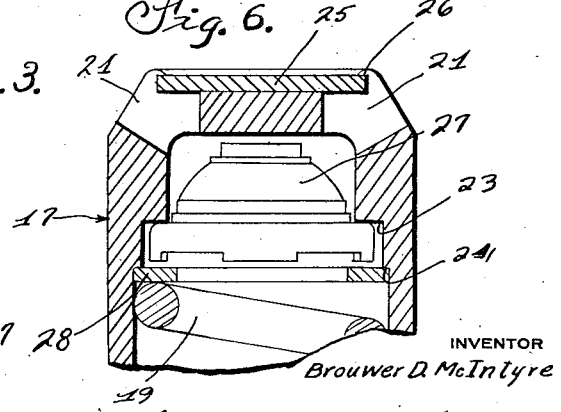
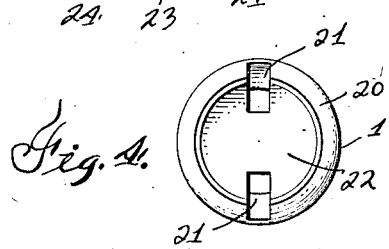
INVENTOR
Brouwer D. McIntyre
ATTORNEYS Patented Dec. 22, 1931

1,837,914

UNITED STATES PATENT OFFICE

BROUWER D. McINTYRE, OF MONROE, MICHIGAN, ASSIGNOR TO MONROE AUTO EQUIPMENT COMPANY, OF MONROE, MICHIGAN, A CORPORATION OF MICHIGAN

PISTON CONSTRUCTION

Application filed July 29, 1929. Serial No. 381,984.

This invention relates to shock absorbers and more particularly to improvements in the construction of the pistons employed in shock absorbers of, for instance, the hydraulic type.

Heretofore difficulty has been experienced in producing pistons having apertured heads, because with ordinary cast metal pistons it has been necessary to form the apertures by drilling, which required special fixtures, especially in that type of piston where it was necessary or advisable to position the axis of the apertures at an angle to the longitudinal axis of the piston.

Moreover, in constructing hollow pistons by heretofore known methods, the construction of which required annular seats or shoulders in the inner wall thereof, it was necessary to machine these shoulders. This also is an expensive operation.

It is therefore one of the primary objects of this invention to provide a piston having an apertured head and annular shoulders on the inner wall thereof, which piston may be manufactured quickly, easily and economically and the disadvantages heretofore encountered eliminated. To this end I propose producing the piston by die-casting operation, at which time both the apertures in the head thereof and the annular shoulders on the inner wall thereof may be formed.

Another important feature and object of the invention is to provide, in a piston construction of this character, a hardened bearing disk or plate on the outer surface of the piston head whereby this disk may successfully resist wear occasioned thereto by the engagement therewith of the piston actuating arm.

The several objects, advantages and novel details of construction of the invention will be made more apparent as this description proceeds, especially when considered in connection with the accompanying drawings wherein Figure 1 is a fragmentary elevational view of a portion of a motor vehicle showing one type of shock absorber, with which the piston forming the subject matter of this invention may be employed;

Figure 2 is a vertical sectional view through the type of shock absorber illustrated in Figure 1, showing my improved piston associated therewith;

Figure 3 is an enlarged longitudinal sectional view through the piston before the bearing disk is associated therewith;

Figure 4 is a top plan view of the piston;

Figure 5 is a separated perspective view of the piston and hardened bearing disk; and Figure 6 is an enlarged fragmentary sectional view through the upper end of the piston.

Referring now more particularly to Figure 1, it will be noted that there is fragmentarily illustrated a portion of the frame 10 of a motor vehicle, together with the spring 11 and axle 12 thereof. A conventional form of shock absorber 13 is illustrated as attached to the frame 10 and the exterior arm 14 thereof is connected, as for instance, by means of a flexible instrumentality 15 to the axle 12.

In Figure 2 the interior arm 16 which is connected to and actuated by the exterior arm 14 is illustrated. This interior arm is adapted to depress the piston 17, which reciprocates in the cylinder 18, against the action of the spring 19. The structure thus far described is herein shown merely for the purpose of clearly indicating one use to which the piston forming the subject matter of my invention may be put. It will be obvious, however, to those skilled in this art, that various other types of shock absorbers, both single and double acting, may use to advantage a piston constructed in accordance with this invention and as a consequence this invention should not be considered as limited by reason of any disclosure or reference to any particular type of shock absorber.

The piston 17 shown in longitudinal section in Figure 3 is formed by a die-casting operation, at which time the head 20 thereof is formed with one or more apertures 21. The head is also formed with a substantial axial shallow recess 22, this recess extending over a portion of the apertures 21. The inner wall of the piston is formed with a pair of longitudinally spaced annular shoulders 23 and 24, the shoulder 23 being of a smaller diameter than the shoulder 24 and being arranged closer to the apertures 21.

The recess 22 (see Figures 2, 5 and 6) is adapted to receive a hardened sheet or disk 25, preferably of steel, which acts as a bearing surface for the interior arm 16. This disk 25 is adapted to fit within the recess 22 and thereupon the material of the piston at the upper edge of the recess is spun over, as indicated at 26 in Figure 6, to rigidly secure the bearing disk 25 in place. The depth of the recess 22 and the thickness of the disk 25 are substantially the same, so that when in place the disk 25 is arranged substantially flush with the head of the piston. When the disk 25 is secured in place it extends over the adjacent sides of the apertures 21 and partially restricts these apertures. Therefore these apertures may, in the first instance, be made slightly larger than final requirements demand to thus facilitate the formation thereof during the die-casting operation.

The shoulder 23 forms a seat for a valve device 27 which is adapted to control the apertures 21. Ordinarily this valve device is so constructed as to permit the substantially free flow of fluid through said apertures when the piston moves in one direction and to resiliently restrict the flow of fluid therethrough when the piston moves in the opposite direction. With the herein described construction it is convenient to have the valve device seat upon the annular shoulder 23 arranged nearer the head of the piston, as best illustrated in Figure 6.

The other annular shoulder 24 forms a seat for an annular ring-like member 28, which constitutes an abutment for the adjacent end of spring 19, which in the particular form of shock absorber herein illustrated, acts to normally urge the piston upwardly. As illustrated, this spring extends into the open end of the hollow piston and rests against the annular member 28, which in turn seats upon the annular shoulder 24. The diameters of the shoulders 23 and 24 decrease toward the head of the piston so as to facilitate the assembly of the parts. The annular member 28 also acts as a stop to limit movement of the valve device 27 away from its seat 23.

From the foregoing it will be readily apparent to those skilled in this art that pistons constructed in accordance with this invention may be manufactured quickly, easily and economically and that many of the disadvantages encountered in connection with case pistons are eliminated. The pistons may be formed of aluminum or aluminum alloy because, by reason of the association with the head of the hardened steel disk 25, the wear occasioned thereto by the interior arm 16, or other piston actuating means, can be successfully resisted.

Various changes and modifications in many of the non-essential details of construction may suggest themselves to those skilled in this art, and to this end reservation is made to make such changes as may come within the purview of the accompanying claims.

What I claim as my invention is:

1. As an article of manufacture, a die cast piston cast with an aperture extending through the head thereof and with a recess in the head and a hardened disk constituting a bearing surface secured in said recess and partly covering said aperture.

2. As an article of manufacture, a piston cast with apertures extending through the head adjacent the periphery thereof and with a recess in said head in substantially the axial center thereof and a hardened steel disk constituting a bearing surface secured in said recess and partially covering said apertures.

3. As an article of manufacture, a hollow piston formed with apertures in the head thereof and with longitudinally spaced internal annular shoulders constituting respectively a valve seat and an abutment rest, as and for the purpose set forth.

4. As an article of manufacture, a hollow piston formed with apertures in the head thereof and with longitudinally spaced internal annular shoulders constituting respectively a valve seat and an abutment rest, said shoulders decreasing in diameter toward said head.

In testimony whereof I affix my signature.

BROUWER D. McINTYRE.